(12) United States Patent
Gossiaux et al.

(10) Patent No.: US 11,509,449 B2
(45) Date of Patent: *Nov. 22, 2022

(54) SYSTEMS AND METHODS FOR SELF-FORMATION AND SELF-MANAGEMENT OF FULL-DUPLEX COMMUNICATION NETWORKS

(71) Applicant: Rugged Solutions America, LLC, Spartanburg, SC (US)

(72) Inventors: Jason Gossiaux, Leander, TX (US); James Chaput, Austin, TX (US); James P. Roberts, Austin, TX (US)

(73) Assignee: Rugged Solutions America, LLC, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,011

(22) Filed: Mar. 15, 2021

(65) Prior Publication Data
US 2021/0203470 A1    Jul. 1, 2021

Related U.S. Application Data

(63) Continuation of application No. 16/390,900, filed on Apr. 22, 2019, now Pat. No. 10,951,387.

(51) Int. Cl.
| H04L 5/14 | (2006.01) |
| H04L 41/12 | (2022.01) |
| H04R 1/08 | (2006.01) |
| H04R 1/10 | (2006.01) |

(52) U.S. Cl.
CPC ............. *H04L 5/14* (2013.01); *H04L 41/12* (2013.01); *H04R 1/08* (2013.01); *H04R 1/1008* (2013.01); *H04R 1/1041* (2013.01)

(58) Field of Classification Search
CPC .................................. H04L 5/14; H04L 41/12
USPC ................................................................ 370/276
See application file for complete search history.

(56) References Cited

U.S. PATENT DOCUMENTS

| 6,563,804 B1 | 5/2003 | Iyer et al. |
| 10,951,387 B2 | 3/2021 | Gossiaux et al. |
| 2015/0023227 A1 | 1/2015 | Khoo et al. |
| 2015/0382375 A1 | 12/2015 | Bhushan et al. |
| 2016/0164726 A1 | 6/2016 | Fraser |
| 2017/0277560 A1 | 9/2017 | Lucas et al. |

*Primary Examiner* — Angel T Brockman
(74) *Attorney, Agent, or Firm* — Bose McKinney & Evans LLP

(57) ABSTRACT

Disclosed herein are systems and methods for self-formation and self-management of full-duplex communication networks. In an embodiment, a communication device determines whether there is an available self-assignable device-data time slot. If there is, the device selects an available time slot for outbound transmissions, updates its network-status table to associate the selected time slot with a device identifier of the communication device, and transmits outbound device data during the selected time slot of at least one ensuing frame. The device also, during each of a plurality of ensuing frames, makes a determination as to whether to transmit a maintenance packet during a shared time slot of the current frame. If the determination is made in the affirmative, the device transmits such a packet during that shared time slot. Each such packet contains at least a subset of the network-status table.

20 Claims, 13 Drawing Sheets

SYSTEMS AND METHODS FOR SELF-FORMATION AND SELF-MANAGEMENT OF FULL-DUPLEX COMMUNICATION NETWORKS

CROSS-REFERENCE TO RELATED APPLICATION

The present application is a continuation of U.S. patent application Ser. No. 16/390,900, filed Apr. 22, 2019, the disclosure of which is expressly incorporated herein by reference.

FIELD OF THE DISCLOSURE

The present disclosure relates generally to communications systems in which audio (e.g., voice) and/or other types of data is exchanged among multiple devices in real-time with full-duplex functionality, and more specifically to systems and methods for self-formation and self-management of full-duplex communication networks.

BACKGROUND

Many types of electronic devices communicate with each other in order to transmit data (e.g., audio data) for the performance of certain tasks, the conveyance of information, and/or the like. Most communications networks deployed today require a wireless access point, master device, or group of coordinating devices in order for the network to form and operate correctly and allow more than just two devices to simultaneously communicate with one another. The equipment that is required to create this type of many-to-many network can be cumbersome and expensive to deploy, and may require significant setup and initiation time to form and activate a network. Further, the necessity of a master device creates a single point of failure for the network—i.e., for all devices. Moreover, data (e.g., audio data) often needs to be exchanged in real-time with full-duplex capabilities.

Existing master-less wired or wireless systems—such as those that are used for police radio communications, for example—operate in a half-duplex manner, where only one person can speak at a time and must push a button to do so (i.e., "push-to-talk" (PTT)). Existing multi-device systems such as conference calling or cell phones rely on the presence of a master device or set of devices to coordinate time access for the system, and all data must travel through the master.

Thus, there is a need for an improved system that does not require an access point, master station, or one or more independent coordination devices to allow any and all of the devices to simultaneously form a network and communicate with each other in real-time, with determinism, low-latency, and full-duplex functionality. Advantageously, such a system would be "master-less", "instant-on", and include group-forming technology.

Some examples of contexts that would benefit from multiple devices that are able to communicate in real-time with full-duplex capabilities include:
- wireless, full-duplex audio headsets for groups of emergency responders on an incident scene, where a two-way, hands-free conversation could take place among multiple people;
- factory automation systems involving real-time, closed-loop control, where actuators act upon inputs from sensors to control a process, and in which the sensors and actuators are distributed and independent and do not depend on a master controller (which could be a single point of failure)—such devices could be networked over wires and/or wirelessly;
- chemical-processing plants that require the coordination of valves and sensors to maintain the correct pressures in different chambers and vessels;
- greenhouses that require precise coordination of heating and cooling devices, misters, fans, and vents across the facility to maintain proper temperature and humidity levels; and
- wireless communications devices for construction workers on a worksite.

Overview

Disclosed herein are systems and methods for self-formation and self-management of mono-channel, full-duplex communication networks.

The present disclosure relates generally to providing real-time data (e.g., digital-audio) communications capabilities with full-duplex functionality among multiple devices using a group-forming approach that does not require devices to pair amongst themselves and does not require a master device to control the communications network. In embodiments that operate according to wireless communication, any two or more communication devices operating on a common frequency (i.e., channel), once powered on or brought within range (if wireless) of at least one other device, responsively create a group (i.e., an ad hoc network). One or more devices that are in a common network at a given time can also delete data pertaining to devices that are powered off or go out of range (if wireless) of the other devices, and can also allow additional devices to join at any time. Such ad hoc networks can split and merge without disruption.

Aspects of the present disclosure relate to systems and methods for network formation, synchronization, nodes joining a formed network, nodes leaving a formed network, and the like, all without any one or more devices serving a master role. According to at least one embodiment, communication devices are associated with respective unique device identifiers (i.e., device IDs). Such device IDs in some embodiments are stored in a flash-memory or other data-storage component of each respective device that is configured according to the present systems and methods.

In at least one embodiment, communication devices self-assign a particular reoccurring time slot in a time-division-multiplexed air-interface structure that includes, in each of a plurality of frames, both (i) a plurality of time slots that are each self-assignable to respective devices and (ii) a shared time slot that is utilized at various times by different respective devices on a given network to share network coordination and configuration data.

In at least one embodiment, network-management functions such as joining, leaving, merging, and splitting are handled in a time-synchronized manner by the respective communication devices each acting as an autonomous actor to achieve beneficial group results such as flexibility and malleability of networks that operate in an inclusive manner to promote useful group communications. Such collective action enables the exchange of real-time, low-latency and deterministic data without one or more master/coordinator devices being needed.

Some embodiments of the present systems and methods take the form of methods while others take the form of individual communication devices that are equipped, programmed, and configured to carry out one or more of said methods. Other embodiments take the form of one or more computer-readable medium (CRM) or media containing instructions executable by one or more processors for carrying out one or more of said methods.

Still other embodiments take the form of multi-device systems that may be homogenous or heterogeneous with respect to device type. For example, some embodiments take the form of multiple functionally identical devices that are arranged to be able to communicate among one another, while other embodiments take the form of one or more communication devices of a first type (where groups of two or more such devices are arranged to be able to communicate among one another) as well as one or more communication devices of a second type, where there is at least one communication link between a device of the first type and a device of the second type, and in some embodiments where at least one device of the second type provides communicative access to one or more other devices, networks, and/or the like. Still other arrangements will occur to those of skill in the art having the benefit of the present disclosure.

In at least one embodiment, one or more of the communication devices takes the form of a wireless-communication-capable headset. In at least one embodiment, one or more of the devices takes the form of a data-communication device that is in operable communication with and/or includes one or more other type of device such as a sensor, an actuator or other mechanical control, an electronic control panel, and/or the like. In any embodiment, the transmitted data could be or include audio data, any other type of data, compressed data, encrypted data, and/or the like.

The present systems and methods enhance the reliability and therefore promote increased safety in many contexts such as that of first responders in emergency situations. Operating without a master device removes the possibility of having a single point of failure, as the communication nodes according to the present disclosure self-manage ad hoc networks that include any and all devices that are in range, powered on, and functioning properly.

Moreover, various embodiments of the present systems and methods make efficient and intelligent use of what is known in the art as a half-duplex communication technology. In some such embodiments, that half-duplex communication technology takes the form of a single physical carrier frequency on which only one device can successfully transmit at any given moment. By sharing the air interface using time-division multiplexing as described herein, the present systems and methods achieve full-duplex (i.e., two-or-more-way) communication via a half-duplex communication technology.

One embodiment takes the form of a method carried out by a communication device that includes data storage and a communication interface. The method includes determining whether or not there is at least one available self-assignable device-data time slot among N self-assignable device-data time slots in a frame structure. The frame structure also includes a shared network-self-administration time slot. The method also includes, if there is at least one available device-data time slot, then: selecting an available device-data time slot for outbound transmissions; updating a network-status table maintained in the data storage to include an association between the selected device-data time slot and a device identifier of the communication device; transmitting outbound device data via the communication interface during the selected device-data time slot of at least one ensuing frame; and during each of a plurality of ensuing frames, making a determination as to whether to transmit a maintenance packet during the shared network-self-administration time slot of the current frame, and transmitting such a packet via the communication interface during said shared time slot if the determination is made in the affirmative, each such maintenance packet containing at least a subset of the network-status table.

Another embodiment takes the form of a system that includes a communication interface, a processor, and data storage that contains instructions executable by the processor for carrying out the functions listed in the preceding paragraph. Still another embodiment takes the form of a CRM containing instructions executable by a processor for carrying out at least those functions.

Furthermore, a number of variations and permutations of the above-listed embodiments are described herein, and it is expressly noted that any variation or permutation that is described in this disclosure can be implemented with respect to any type of embodiment. For example, a variation or permutation that is primarily described in connection with a method embodiment could just as well be implemented in connection with a system embodiment and/or a CRM embodiment. Furthermore, this flexibility and cross-applicability of embodiments is present in spite of any slightly different language (e.g., process, method, steps, functions, set(s) of functions, and/or the like) that is used to describe and/or characterize such embodiments.

BRIEF DESCRIPTION OF THE DRAWINGS

The above-mentioned and other features and advantages of this disclosure, and the manner of attaining them, will become more apparent and the disclosure itself will be better understood by reference to the following description of embodiments taken in conjunction with the accompanying drawings.

Corresponding reference characters indicate corresponding parts throughout the several views. The exemplifications set out herein illustrate embodiments of the disclosure, and such exemplifications are not to be construed as limiting the scope of the disclosure in any manner.

DETAILED DESCRIPTION OF THE DRAWINGS

I. Introduction

Figure 1:
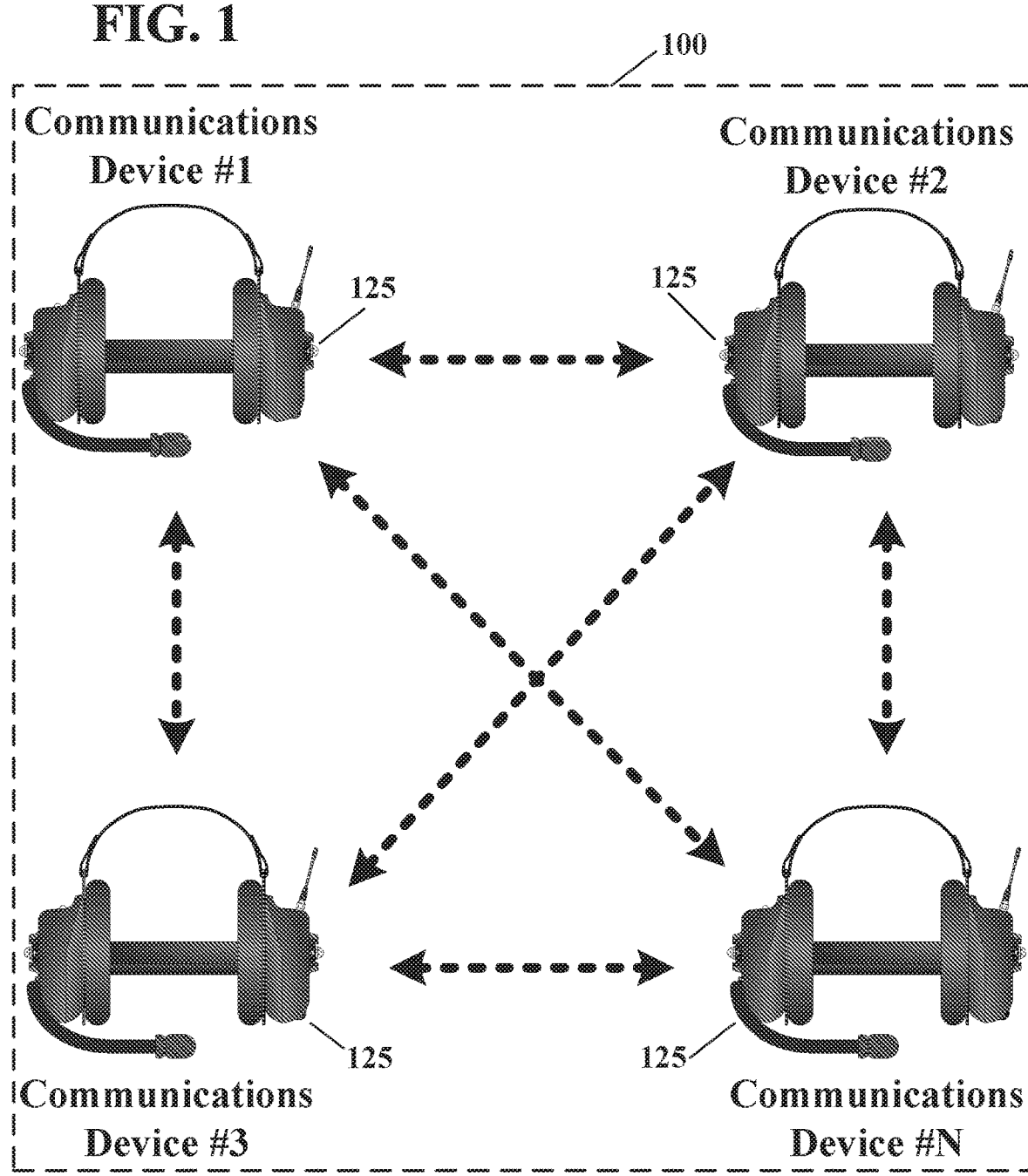
FIG. 1 is a diagrammatic representation of a group communications system that includes multiple communication devices that operate according to an exemplary embodiment.

To promote an understanding of the principles of the present disclosure, reference is made below to the embodiments that are illustrated in the drawings. The embodiments disclosed herein are not intended to be exhaustive or to limit the present disclosure to the precise forms that are disclosed in the following detailed description. Rather, the described embodiments have been selected so that others skilled in the art may utilize their teachings; accordingly, no limitation of the scope of the present disclosure is thereby intended.

It is to be understood that the present systems and methods are not limited to specific solvents, materials, circuits, appliances, or device structures, as such may vary. It is also to be understood that the terminology used herein is for the purpose of describing particular embodiments only and is not intended to be limiting.

As used in this specification and the appended claims, the singular forms "a," "an," and "the" include both singular and plural referents unless the context clearly dictates otherwise. Thus, for example, reference to "an active ingredient" includes a plurality of active ingredients as well as a single active ingredient, reference to "a temperature" includes a plurality of temperatures as well as single temperature, and the like.

Furthermore, there is no intention to be bound by any theory presented in the preceding background or the following detailed description of the drawings.

In any instances in this disclosure—including in the claims—in which numeric modifiers such as first, second, and third are used in reference to components, data (e.g., values, identifiers, parameters, and/or the like), and/or any other elements, such use of numeric modifiers is not intended to denote or dictate any specific or required order of the so-referenced elements. Rather, any such use of numeric modifiers is intended solely to assist the reader in distinguishing any elements that are referenced in this manner from one another, and should not be interpreted as insisting upon any particular order or carrying any other significance, unless such an order or other significance is clearly and affirmatively explained herein.

Moreover, consistent with the fact that the entities and arrangements that are depicted in and described in connection with the drawings are presented as examples and not by way of limitation, any and all statements or other indications as to what a particular drawing "depicts," what a particular element or entity in a particular drawing "is" or "has," and any and all similar statements that are not explicitly self-qualifying by way of a clause such as "In at least one embodiment, . . . ", and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in the ensuing detailed description.

In the following detailed description, exemplary embodiments of the present systems and methods are described. Numerous variations on these embodiments will naturally occur to a person of skill in the art.

II. Example Architecture

A. Multi-User Communications System

FIG. 1 is a diagrammatic view of an improved wireless communications system 100 composed of devices 125 which communicate with each other in full duplex in real-time. Such a system 100 could be used in a multitude of applications including but not limited to construction sites, factories, warehouses, and search-and-rescue operations. The four devices 125 are representative individual positions and are identical to each other in design and build. Devices 125 can be seen in more detail in FIG. 2 with the front 150 and rear 160 views of the overall device 125. The communications devices that could be used by the technology described herein could vary in many ways. These devices 125 are described herein for example only and not by way of limitation. In at least one embodiment, the devices 125 are worn by individual users and allow the users to communicate amongst themselves in real-time and full duplex.

Figure 2:
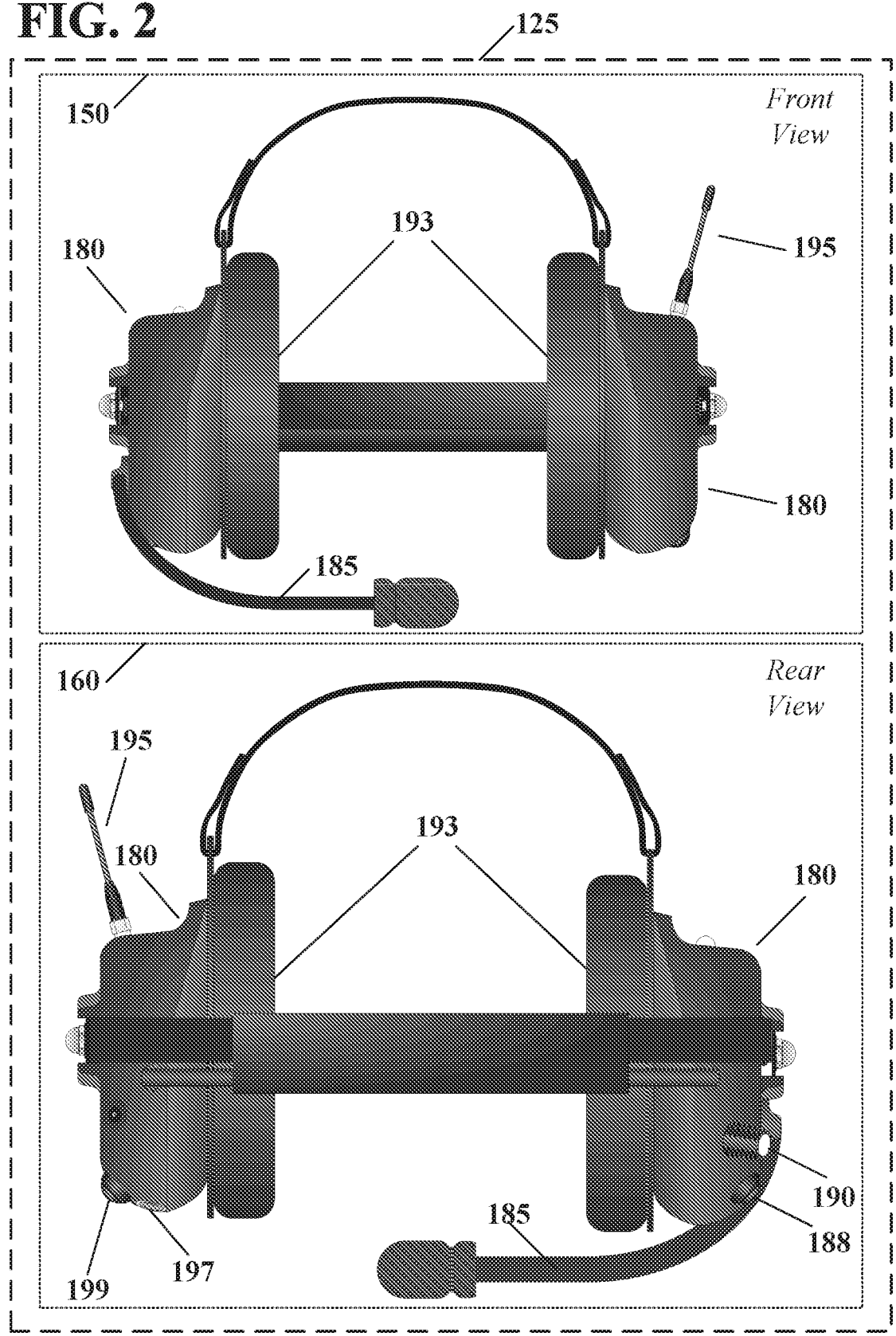
FIG. 2 is a close-up view (front and back views) of a communications device for use in FIG. 1 according to an exemplary embodiment.

These devices 125 shown in FIGS. 1 and 2 have earcups 180 that are noise reducing so that they can be used in high-noise environments and protect the hearing of the user. Noise reducing cups 180 are not a requirement for the system 100. The devices 125 also have a dual-element noise-cancelling boom microphone 185 which works well in high-noise environments to reduce the amount of external ambient noise that gets transmitted to the other devices 125 in the network 100. Such a specialty microphone is not a requirement for the system 100. In this implementation, the user can mute the microphone 185 by momentarily pressing the mute/channel change switch 188 on the device 125. The switch 188 for the mute function is "push-on/push-off". A first momentary press of the switch 188 mutes the microphone 185. A next momentary press of the switch 188 unmutes the microphone 185. Such a microphone mute function is not a requirement for the system 100.

Figure 3:
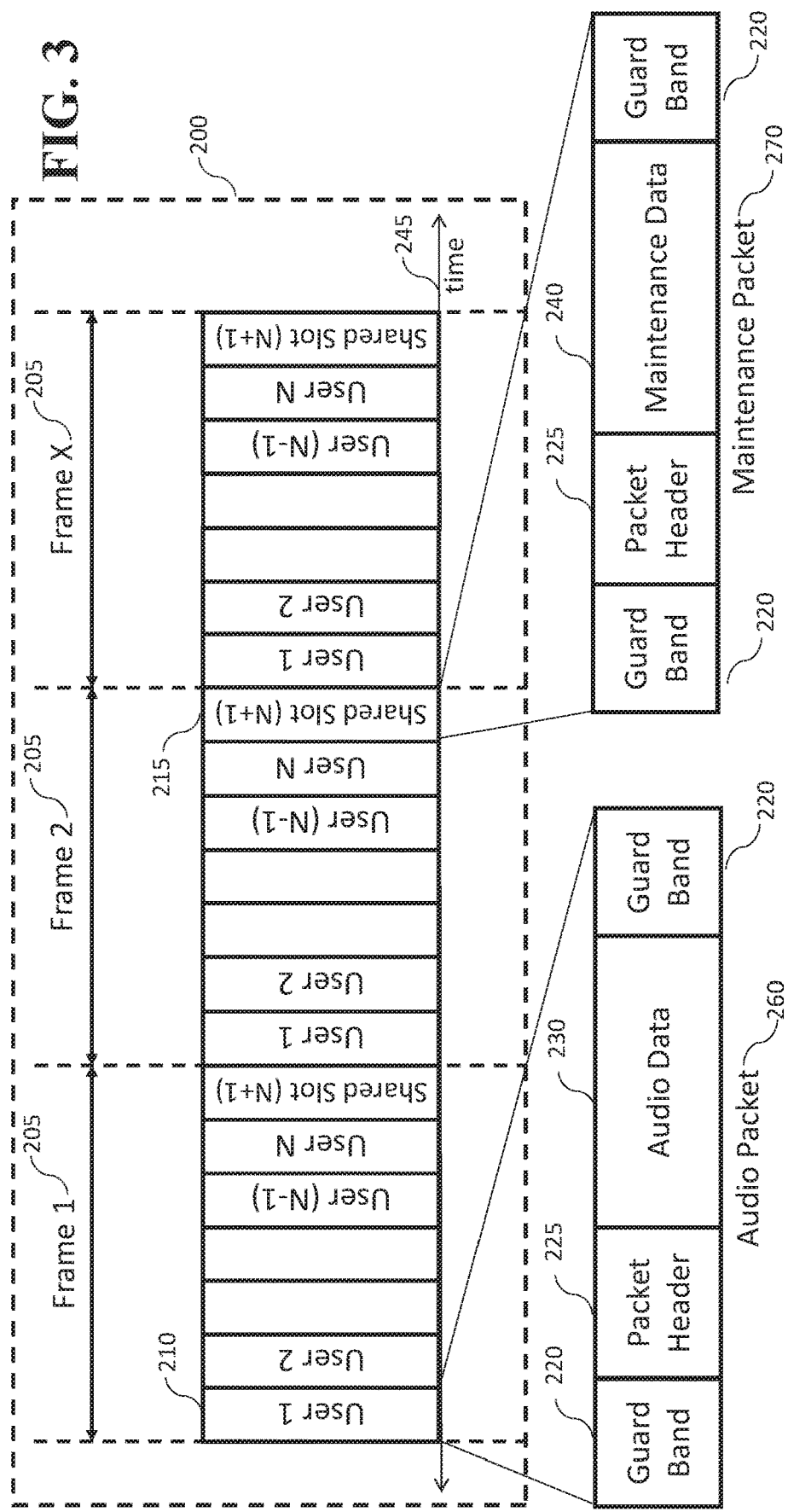
FIG. 3 is a diagram of a channel with time slots according to an exemplary embodiment.

When two or more of the devices 125 are powered on (in range of one another) by rotating the volume control and on/off switch 190 clockwise, a communications group/network 100 is created. As seen in FIG. 3, each device 125 assigns itself to a time slot 210 within the network 100.

FIG. 3 depicts an example structure for data activity on a channel 200 over time 245. Each channel 200 contains N time slots 210, plus one shared time slot 215, organized into sequential data frames 205. The number of time slots 210 per frame 205 and the packet format and frame size are software-configurable but, in at least one embodiment, must be configured identically in all devices 125 operating on the network 100 and is limited by the channel bandwidth and bitrate of transmission.

In an embodiment, to form a network 100, two or more devices 125 are powered up, in range of one another, and configured for operation on the same channel 200. After a device 125 assigns itself to a time slot 210, the device 125 will proceed to transmit an audio packet 260 during its time slot 210. In an embodiment, each audio packet 260 includes a leading and trailing guard band 220, a packet header 225 and audio data 230. The guard bands 220 protect the data integrity for adjacent time slots 210 by providing padding for clock jitter and non-deterministic interrupt latencies from device 125 to device 125.

In at least one embodiment, every device 125 comes programmed with a unique device ID (e.g., a serial number) during manufacturing. In some embodiments, this device ID is derived from a hardware MAC ID or other number. The device ID allows accurate identification of each device 125 during packet exchange. In some embodiments, the devices 125 self-assign the device ID dynamically. For example, in one embodiment each device 125 could use the radio as a true random number generator to dynamically assign itself a unique 32-bit identifier. In the rare instance in which two devices assign themselves the same identifier, one or both of these devices 125 would be able to detect this and select a new random identifier until power cycled.

In at least one embodiment, each packet header 225 contains a length of the audio packet 260, frame control fields for address filtering, a data sequence number, a source-device ID, a destination device ID (if applicable), a last-packet-received timestamp, a bit-packed field of all occupied time slots 210, a packet type, a current channel 200, and then the device ID and time slot information for one other randomly selected device on the current network 100, followed by a checksum. In this example, the audio data payload 230 contains 286 bytes of compressed audio data followed by a 4-byte cyclic redundancy check (CRC). In some embodiments, the packet header 225 also includes a network ID. In one embodiment, the network ID matches the device ID that occupies the lowest-numbered (occupied) slot in the current network. In other embodiments, the (e.g., 32-bit) network ID is randomly generated at network-formation time from the radio's (e.g., true) random number generator. When utilized, this field is useful for displaying information about networks in a given area and allows for more robust network merging and splitting.

All devices 125 on the network 100 receive all the audio packets 260 transmitted in each frame 205 and repeat this behavior for sequential frames 205 over time 245.

A shared time slot 215 exists at the end of each frame 205. In at least one embodiment, devices 125 on the network 100 randomly transmit a maintenance packet 270 in the shared time slot 215. In at least one embodiment, each maintenance packet 270 contains two guard bands 220, a maintenance header 235 and a data payload 240 listing all time slots 210 and device IDs it has recorded on the network 100. Device 125 specific data such as temperature, battery health, received signal strength indicator (RSSI) and other metrics may also be included in the data payload 240. The maintenance packet 270 serves as an asynchronous side communication mechanism for the network 100. In at least one embodiment, the data payload 240 of each maintenance packet 270 includes 124 bytes reserved for substantive maintenance data and a 4-byte CRC for a total payload size of 128 bytes.

In at least one embodiment, maintenance packets 270 use the same packet header 225 as audio packets 260. The maintenance data 240 includes an array comprising all time slots and what device IDs occupy each slot, and an array with the amount of time elapsed since each device ID was last heard from. Packets in the shared time slot 215 would collide 100% of the time if every device was transmitting them every frame 205. It is preferable that one maintenance packet 270 from any device 125 be transmitted in a frame 205, and so devices 125 use a random number generator to determine whether they will transmit during a frame 205 to reduce the probability of collisions. This random chance is reduced as more devices 125 join the network 100 to reduce the potential for collisions. In this example, with two devices 125 on the network 100, each device 125 has approximately a 15% chance of transmitting a maintenance packet 270. With eight devices 125 on the network 100 this drops to approximately 6%. In an embodiment, these percentages are implemented using a lookup table in each device 125 that associates the number of devices 125 on the network 100 to a corresponding numerical value between, e.g., 0 and 100. In each time slot 210, the devices 125 may generate a random number that is also between 0 and 100, and only transmit a maintenance packet 270 in the shared time slot 215 if the generated number is less than or equal to the numerical value from the table. Accordingly, the numerical values from the table would effectively represent the percent chance of a given device 125 transmitting a maintenance packet 270 during the shared time slot 215 of a given frame 205. In some embodiments, each device 125 only carries out this random determination after the expiration of a maintenance-packet timer that the device resets each time it transmits a maintenance packet; such a mechanism further limits the potential for collisions and ensures that each device transmit a maintenance packet no more frequently than once every maintenance-packet-timer period.

Instead of using a randomized approach to reduce the probability of collisions, the devices 125 could take turns transmitting a maintenance packet 270 in order of assigned slot number, in order by device IDs, or according to one or more other approaches.

Additional packet types may be defined and used by other embodiments, utilizing the same packet header 225 and unique configurations for the data to transmit health information such as RSSI, battery life, error codes, or commands across the network 100.

Figure 4:
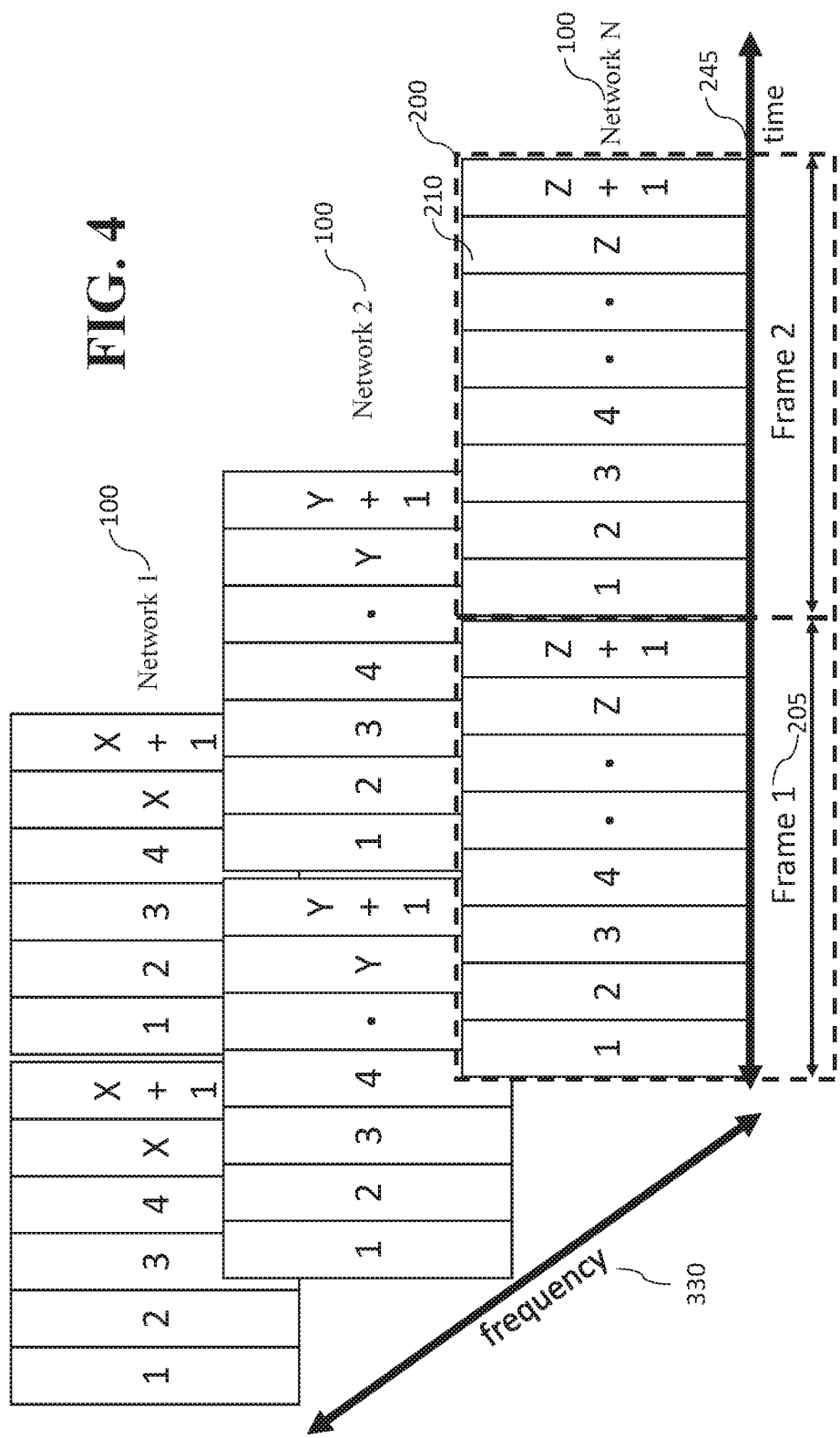
FIG. 4 is a diagram corresponding to multiple networks operating contiguously on different frequency channels each with time slots as illustrated in FIG. 3 according to an exemplary embodiment.

FIG. 4 illustrates multiple networks 100 operating independently and transmitting multiple data frames 205 across multiple channel frequencies 330. Networks 100 operating on different channels 200 do not interact with each other in any way. Each channel 200 may support a unique number of time slots 210 and frame timings 205. The frequencies 330 for each channel 200 do not have to be adjacent to each other and may vary in terms of available bandwidth.

Figure 5:
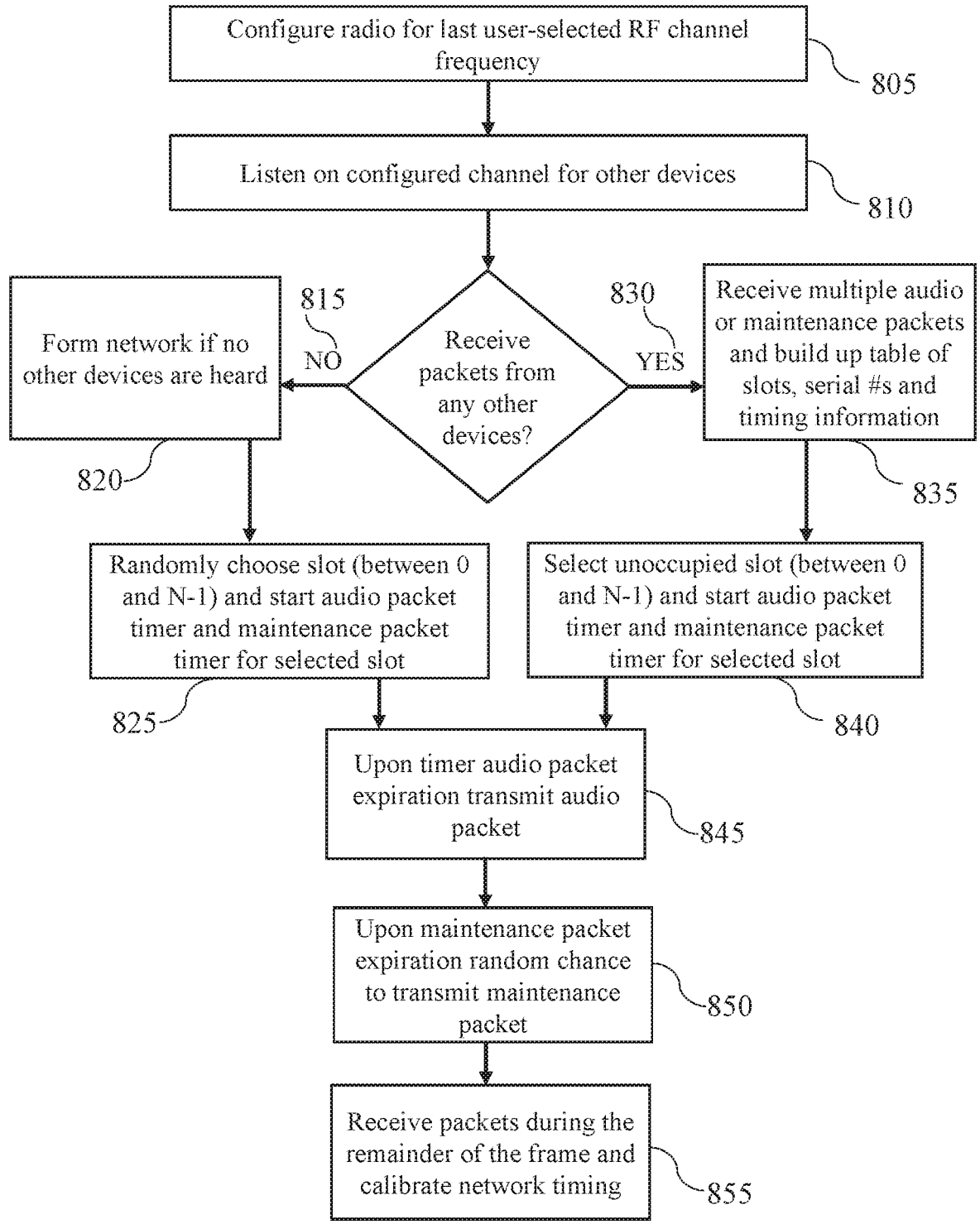
FIG. 5 is a flow chart depicting network-formation-and-joining logic according to an exemplary embodiment.

FIG. 5 is a flow chart demonstrating device 125 logic 800 for network 100 formation and joining. Upon powerup, a device 125 configures itself to the last user-selected channel 200 frequency 805 and spends a software configurable amount of time in receive mode listening for other device 125 transmissions 810. If no transmissions are received in that time window 815, the device 125 forms a new network 100 as described in block 820. The device 125 assumes a random time slot 210 within that network 100 as the first device 125 as described in block 825. The device 125 starts an audio packet 260 timer and a maintenance packet 270 timer to control transmissions 825. In some embodiments, the device 125 also selects a network ID for the new network.

However, if other devices 125 already exist in a network 100 on this channel 200 as described in block 830, the new device 125 waits and collects one frame of audio packets 260 and/or a maintenance packet 270 as described in block 835. Devices 125 utilize the information in these packets to determine which time slots 210 are unoccupied, what the timing of those time slots 210 are, and which device IDs occupy those time slots 210 as described in block 840. This process can occur in as little as a single frame time 205, though a longer delay would improve network 100 formation robustness.

The joining device 125 then randomly selects an available time slot 205 and adjusts an internal hardware timer to synchronize with the network 100 as shown in block 840. When this timer expires it transmits its audio packet 260 in the network 100 as shown in block 845. It also (e.g., periodically) transmits a maintenance packet 270 in the final time slot 210 as described in block 850. It is known that devices 125 will collide in this shared time slot 215, and as the number of devices 125 on the network 100 increase this chance increases, so the devices 125 vary the duty cycle of maintenance packet 270 transmission based on how congested the network 100 is.

The last step a device 125 takes is an ongoing operation while on the network 100. Every received audio packet's 260 timestamp saves in memory and undergoes analysis to calculate the packet jitter within a frame 205 as shown in block 855. This allows each device 125 to calibrate its internal timer and ensure very deterministic behavior even in the presence of device-specific clock jitter and interrupt latencies.

Figure 6:
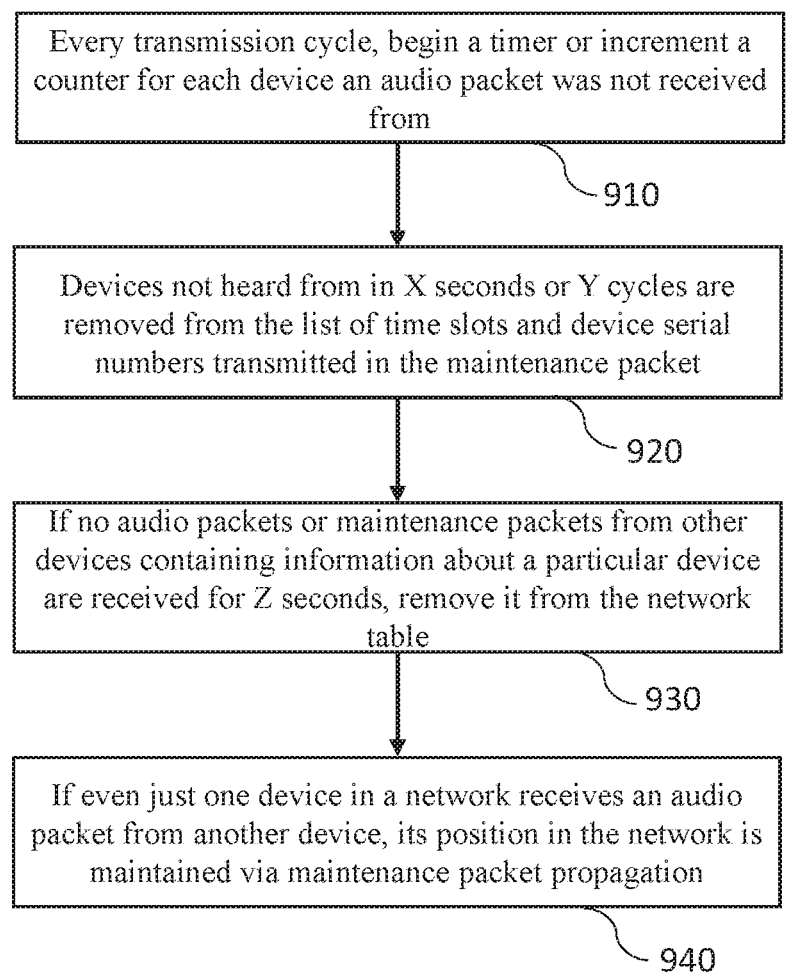
FIG. 6 is a flow chart depicting logic for dropping a communication device from a network according to an exemplary embodiment.

FIG. 6 is a flow chart demonstrating device 125 logic 900 for the device 125 that is executing the logic 900 to consider another device 125 to have left a network 100. Each device 125 keeps track of the last time it received an audio packet 260 or maintenance packet 270 containing the time slot 210 and device ID information from every other device 125 on the network 100 as shown in block 910. If a device 125 A fails to receive any audio packets 260 from a device 125 B for a software configurable timeout period of X seconds, device 125 A will remove device 125 B's device ID and time slot 210 information from any maintenance packets 270 that device 125 A transmits as shown in block 920. If device 125 A further fails to receive any maintenance packets 270 from any device 125 on the network 100 that contain device IDs and time slot 210 information about device 125 B for a software-configurable timeout of Z seconds, then device 125 A will consider device 125 B to no longer be a part of the network 100 as show in block 930.

To address the Hidden Node Problem, maintenance packets 270 contain a listing of every device ID and corresponding time slot 210 on the network 100 as shown in block 940. Hidden nodes in a wireless network are nodes that are out of range of one or more other nodes operating on the same channel (frequency). For example, this could occur in a star network with an access point and many nodes physically surrounding it in a circular (i.e., hub-and-spokes) fashion. Each node is within communication range of the AP, but the nodes cannot communicate directly with each other. Many existing wireless networks that make use of an access point or master (e.g., IEEE 802.11) employ a Request To Send/Clear To Send (RTS/CTS) mechanism to avoid collisions from hidden nodes, at the cost of reduced bandwidth. Others simply suffer from increased collisions, missed packets, and reduced bandwidth when hidden nodes are present. With the present systems and methods, time synchronization and awareness of all nodes including nodes hidden from each other are maintained, so network performance does not degrade when all devices 125 are incapable of receiving packets from all other devices 125, and no bandwidth-reducing RTS/CTS mechanisms are required.

Should a device 125 leave a network 100, it will form a new network 100 if no other devices 125 are in range 815. The device 125 would randomly select a time slot 210 and start audio packet 260 and maintenance packet 270 timers 825, and proceed through the normal transmit state machine 845, 850, 855.

Figure 7:
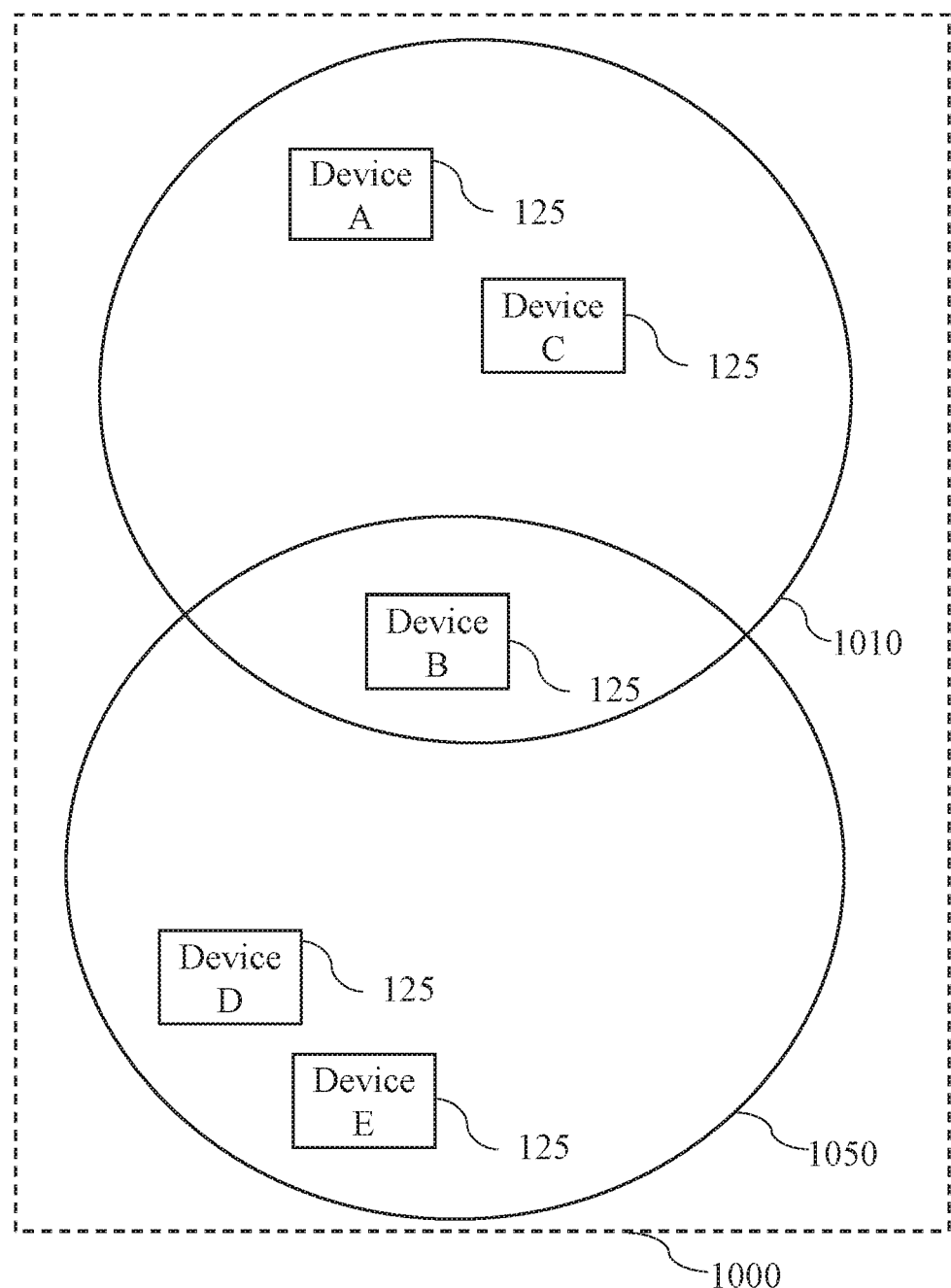
FIG. 7 is a diagrammatic representation of five communication devices forming a single network according to an exemplary embodiment.

FIG. 7 depicts a network 1000 maintained through the application of the present systems and methods, despite all devices 125 of the network 1000 being unable to receive packets from each other. A first subgroup 1010 of three devices A, B, and C are in close proximity of each other and receive audio packets 260 from each other every transmission cycle. A second subgroup 1050 of two devices D and E are in close proximity of each other and receive audio packets 260 from each other every transmission cycle 1050. Devices A and B cannot hear device D or E and vice versa. Device B is in range of both groups of devices and receives audio packets 260 from both. Device B periodically transmits maintenance packets 270 containing time slot 210, timing, and device ID information for all devices in both groups 1010 and 1050. This maintains the bridged network 1000 and allows devices 125 that cannot hear or be heard by every member of the network 1000 to still join the network 1000 and maintain their time slot 210 position and timing, and to avoid triggering the network drop timeout.

Figure 8:
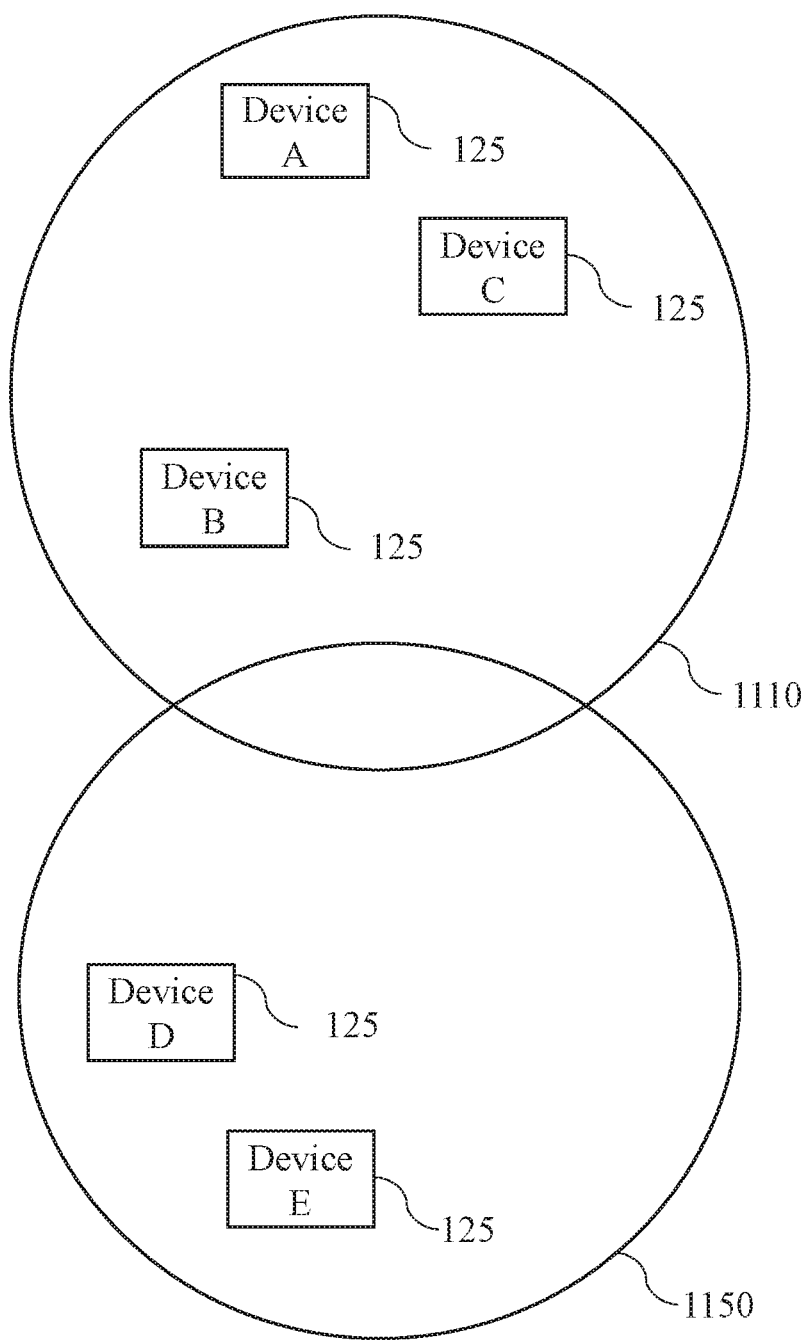
FIG. 8 is a diagrammatic representation where the network of FIG. 7 has two communication devices move out of range of the other three communication devices and thus form two separate networks according to an exemplary embodiment.

FIG. 8 depicts the network 1000 splitting into two distinct networks 1110 and 1150. Network 1000 was originally composed of five devices 125 as depicted in FIG. 7. In FIG. 8, devices D and E have now moved out of range of device B. Because device B stops receiving packets from devices D and E, device B eventually removes devices D and E from the contents of its maintenance packet 270. This then results in devices A and B eventually timing devices D and E out of the network 1110 because device B is no longer including devices D and E in its maintenance packet 270. The same mechanism takes place with headsets D and E timing headset B out of their maintenance packets 270. Now the two groups of devices are their own separate networks 1110 and 1150 with no interruption in transmitted audio between the devices 125 in range of each other.

If any of the devices 125 in either network 1110 or 1150 were to come back into range of devices in the other network, in embodiments that use a network IDs, the first packet received by either independent network 1110 or 1150 will reveal the existence of two network IDs with devices potentially occupying overlapping time slots. In this scenario, each device 125 loops through its list of known devices 125 and time slots 210. In at least one embodiment, the device 125 with the highest device ID becomes the foundation (i.e., timing reference) for the new, combined network 1000. (Lowest device ID could be used instead, among other possible approaches.) Each device 125 then calibrates its internal timers and array of time slots 210 with respect to that highest device ID. Each device 125 then determines whether it is occupying a time slot 210 occupied by another device 125 with a higher device ID. If this is true, the device 125 with the lower device ID selects a new free time slot 210 to occupy for the next frame 205 transmission. In another embodiment—one in which a network ID is not used, a packet received by either independent network 1110 or 1150 would, for one of the two networks, contain a lower device ID than was already present. All devices on that network would then begin using this device for frame timing. If any devices discover, via the data packets and/or maintenance packets, that they were occupying the same time slot as another device, a device with a lower device ID would abandon that time slot and randomly select a new available time slot. This process would continue until all devices occupied a unique time slot.

Once the maximum number of devices 125 are occupying self-assignable device-data time slots on a channel 200, no other devices 125 can be added that have full-duplex communications capability. Devices 125 added beyond the maximum will automatically have listen-only capability and will not be able to transmit to other devices 125 in the network 100. The listen-only devices 100 will be able to receive all communications in each frame of the channel 200. There is an unlimited number of devices 125 that can be listen-only in a network 100. Devices 125 can also be specifically configured to be listen-only such that, even when the channel 200 has not reached maximum capacity of full-duplex devices 125, a device 125 will not be full-duplex.

Listen-only devices 125 do not randomly select a time slot 210 or start timers for audio packets 260 or maintenance packets 270 as shown in block 840. They do not transmit any packets or proceed through the normal state machine as shown in blocks 845, 850, 855. They remain at block 835, receiving audio packets 260 and maintaining a list of time slots 210. When a time slot 210 becomes available, more than one device 125 may attempt to occupy the newly available time slot 210; if so, the device 125 with the highest device ID will prevail in the arbitration and occupy the time slot 840, start timers for audio 260 and maintenance 270 packets, and begin transmissions as shown in blocks 845, 850, 855.

If the devices 125 are wireless, the line-of-sight maximum range between communication devices 125 is a function of the frequency in which a network 100 operates and the power of the transceiver in the devices 125.

In at least one embodiment, changing the channel 200 on a device 125 is a simple procedure. Changing channels 200 allows users to be able to have the flexibility to move to a different channel 200 in order to communicate with a different set of users. It could be engineered in many different ways, but in this implementation, the user simply presses and holds the mute/channel change switch 188 for five seconds. At five seconds, a prerecorded human voice slowly says the number of the next channel 200 and repeatedly cycles through the complete list of channels 200 until the user releases the switch 188. The last channel 200 to be named by the human voice when the switch 188 is released is the channel 200 that is selected. The device 125 then joins the new channel 200 according to the process described in FIG. 5.

In at least one embodiment, in order to communicate with other users on the same channel 200, the user just needs to begin talking into the microphone 185. In this implementation, there is no PTT or voice activation (VOX) to key a radio, though aspects of PTT and VOX could be implemented if so desired. The device 125 continuously broadcasts an audio signal via the antenna 195, so a user need only begin talking for that audio to reach other users.

In such an implementation, when the user speaks into the microphone 185, he or she will hear sidetone from the device's 125 speakers 193. Sidetone is audible feedback to someone speaking when using a handset or headset as an indication of an active transmission, especially useful in the presence of a noisy environment. It is sound picked up by the device's 125 microphone 185 that plays back in real-time into the device's 125 speakers 193, providing feedback to the speaker.

An additional feature in at least one such embodiment is the ability to connect a portable radio to the device 125 via either a cable or wirelessly. If using a cable, then that cable would connect into the portable radio cable jack 197. To key the portable radio, the user would press and hold the portable radio PTT switch 199. While speaking into the microphone 185 and depressing the PTT switch 210, the audio would be transmitted via the portable radio.

Using Bluetooth or another wireless protocol, device 125 could also connect to a mobile phone and/or other wireless devices for additional audio and data functionality.

Device 125 could also be designed to encrypt all transmissions, allowing for higher security of communications.

Figure 9:
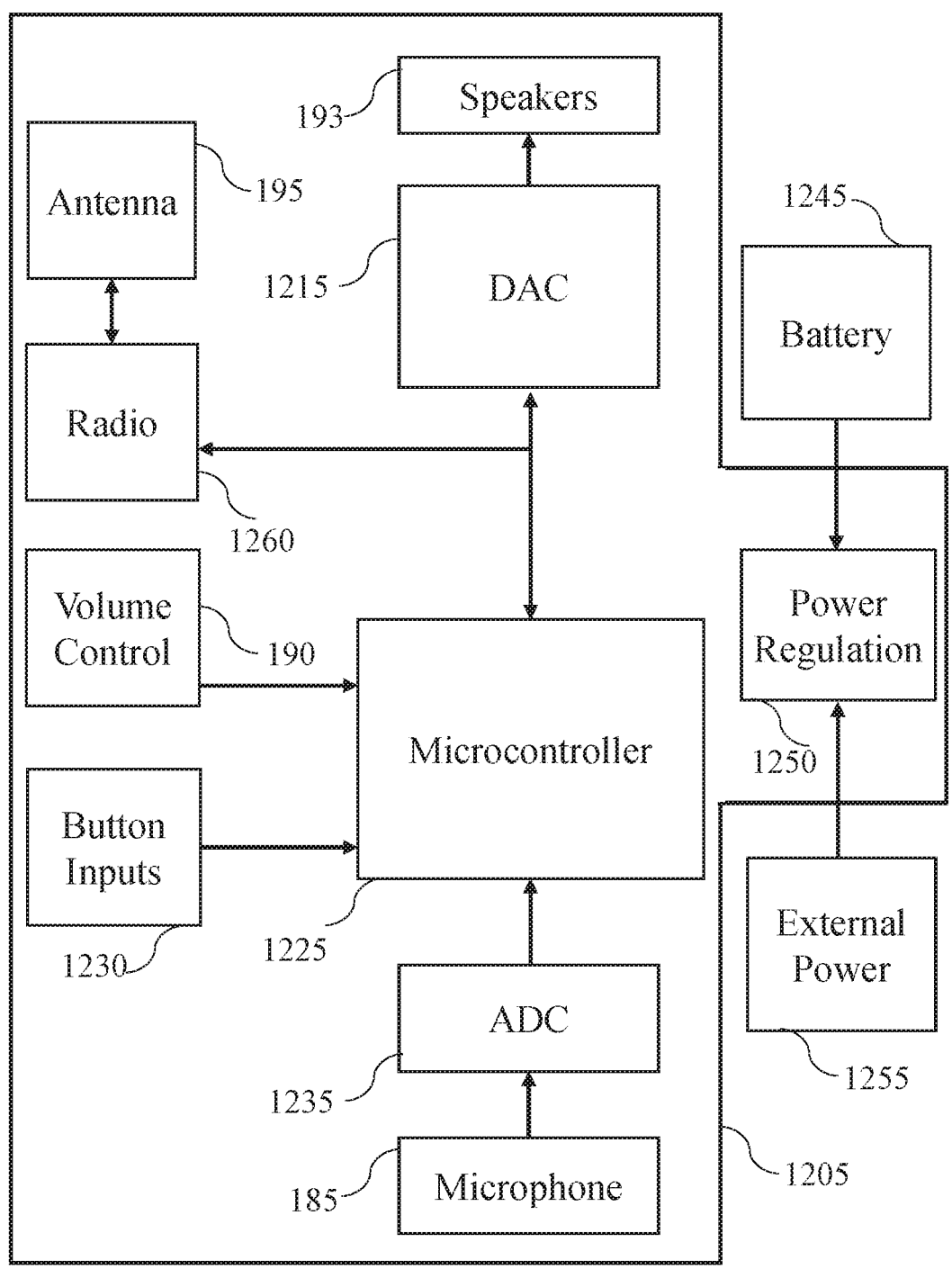
FIG. 9 is a block diagram of a communication device's internal components according to an exemplary embodiment.

FIG. 9 depicts a block diagram of a device's 125 internal capabilities according to at least one embodiment. One or more printed circuit assemblies 1205 receive power from a battery 1245, and optionally from external power 1255. Power regulation 1250 then establishes voltage rails for the electronics. When external power 1255 is present, the battery undergoes charging. A microcontroller 1225 executes codes out of internal or external flash to process the device state machine and network stack.

In this example, the device 125 samples a microphone 185 at an 8-kilohertz-(kHz) sample rate with 16-bit data resolution using an analog-to-digital converter (ADC) 1235. The digitized data streams into the microcontroller 1225 and undergoes compression through one of several algorithms depending on the device configuration settings. Algorithms could include μ-law, adaptive differential pulse-code modulation (ADPCM), and/or G726, and others could be implemented if so desired. This buffer is then preloaded into the radio 1260 (if a wireless device) for transmission when its packet timer expires. This enables extremely precise and deterministic transmission times for the network 100. The audio data is also sent to a digital-to-analog converter (DAC) 1215, a device that generates analog signals from a digital stream of data, for use as local sidetone through the device speakers 193. In this example, this DAC 1215 produces digitized audio at an 8 kHz update rate with 12 bits of resolution.

In an embodiment, the transmitted data undergoes orthogonal frequency division multiplexing (OFDM) modulation for transmission over the air via an antenna 230 located inside or attached to the device 125. The radio 1260 may include software configured for a variety of modulation modes and frequencies depending on the needs for data bandwidth, range, and/or compliance with local laws and regulations, perhaps among other considerations.

Packets received via the antenna 195 undergo demodulation by the radio 1260 and processing by the microcontroller 1225. The processed audio is collected until an entire frame 205 time has expired so all device audio may be combined and streamed together through the DAC 1215 and out the device speakers 193. The audio intensity may be varied through a volume switch 190 connected to the microcontroller 1225 and a switch is available 188 for moving the device 125 to a different channel frequency.

B. Multi-User Communications System with a Mobile-Radio-Connected Device

Figure 10:
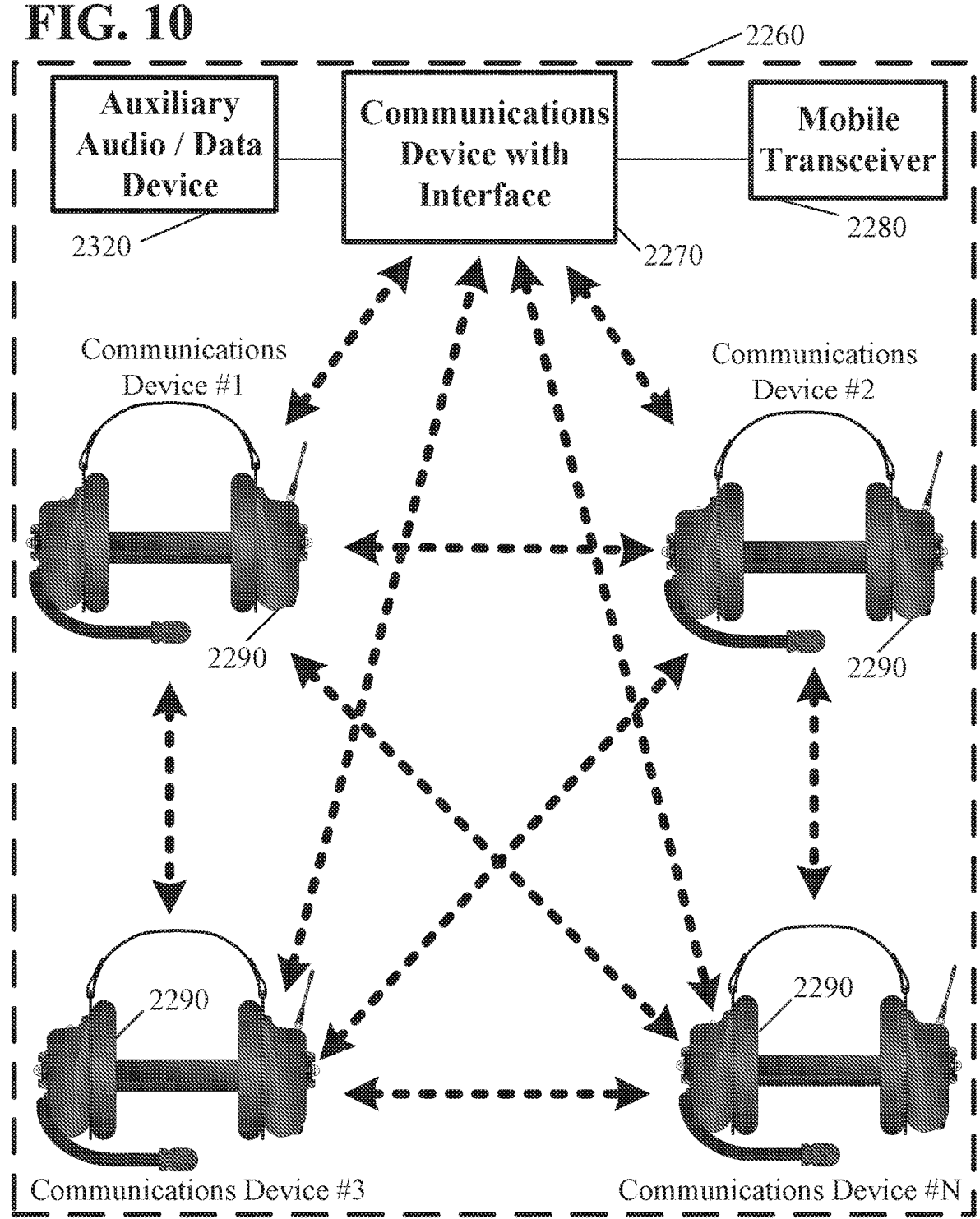
FIG. 10 is a diagrammatic representation of a group communications system with connections to a mobile transceiver and an auxiliary audio/data device according to an exemplary embodiment.

FIG. 10 is a diagrammatic view of an example wireless communications network 2260, which is similar to the network 100 except that the network 2260 has an added device 2270 that is connected (wired or wireless) to one or many radio transceivers 2280. The added device 2270 has full-duplex communications capabilities with all of the other devices 2290 in the channel 200.

Such a network 2260 could be used in a multitude of applications including but not limited to public safety vehicles, emergency dispatch centers, command posts, construction work vehicles, factories, warehouses, and other applications where localized, full-duplex communications is required along with more distant two-way, half-duplex transceiver communications.

Figure 11:
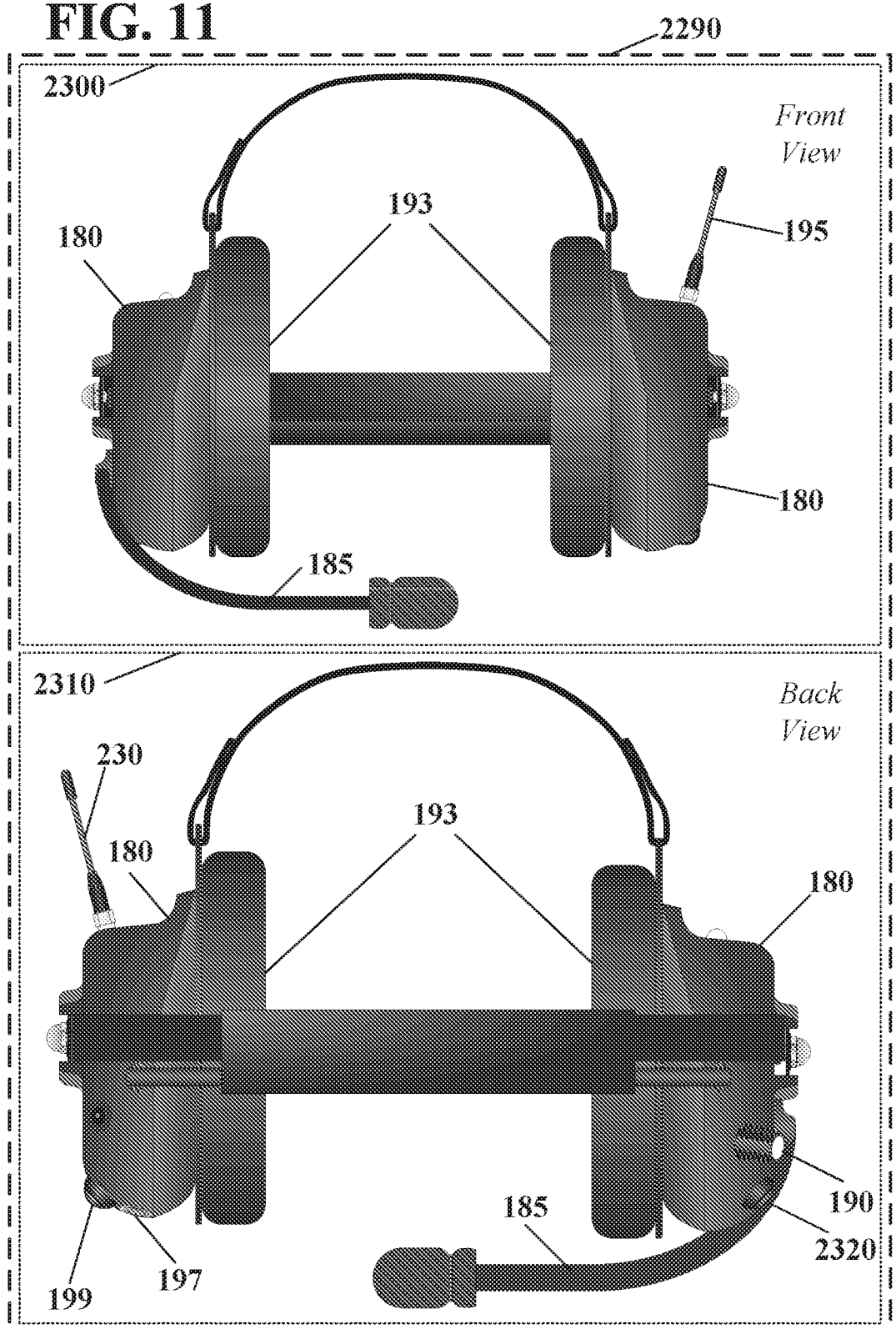
FIG. 11 is a close-up view (front and back views) of a communications device for use in FIG. 10 according to an exemplary embodiment.

The device 2290 can be seen in more detail in FIG. 11 with the front 2300 and rear 2310 views of the overall device 2290. The communications devices that could be used by the technology described herein could vary in many ways. This device 2290 is presented for example only and not by way of limitation.

In at least one embodiment, the device 2270 is able to PTT the radio transceiver 2280, which can then transmit data and audio to a distant transceiver. The other devices 2290 in the channel 200 are able to transmit audio and data over the radio transceiver 2280 by pressing and holding switch 2320 down, which sends a PTT signal to device 2270, which then PTTs the radio transceiver 2280. Once the transceiver 2280 is keyed, the user speaks into the boom microphone 185. This audio is transmitted from device 2290 to all of the other devices 2290 and device 2270 in the channel 200. If device 2270 receives (i) audio and/or data and (ii) a PTT signal from device 2290 that the received audio is meant to be transmitted over the transceiver radio 2280, then the device 2270 keys the transceiver radio 2280 and sends the audio and/or data from 2290 to transceiver 2280, which then transmits the audio and/or data to a distant transceiver. When the user is done transmitting over the transceiver 2280, he/she releases switch 2320.

The device 2270 is also able to receive audio and data from the radio transceiver 2280. All audio and data received by transceiver 2280 are transmitted to device 2270, and then device 2270 transmits all of audio and data to devices 2290 in the channel 200.

In an embodiment, when switch 2320 is depressed, the device 2290 sets a flag in the packet header 225 indicating that a PTT action is in progress. In every frame 205, the device 2270 looks for a device 2290 with a packet header 225 with this PTT flag set. If the PTT flag is set, then the device 2270 routes its audio to the mobile transceiver 2280. Once a device 2290 has the PTT flag set, there is a one-second key-in feature to debounce the key, which is particularly helpful in an environment where packet loss is possible. A device 2290 that triggers the PTT will also take priority over any other devices 2290 that begin to send the PTT flag. If two devices 2290 were to trigger PTT for the first time in the same frame 205, in an embodiment the device with the higher device ID will take priority with respect to access to the PTT capability of the device 2270.

In order to communicate with other users using devices 2290 on the same channel 200, similar to device 125 in system 100, a user using device 2290 with system 2260 just needs to begin talking into the microphone 185. In this implementation, there is no PTT to key a radio or VOX to open a voice gate, though, aspects of PTT and VOX could be implemented if so desired. The device 2290 continuously broadcasts an audio signal via the antenna 195, so a user need only begin talking for that audio to reach other users. The communications amongst the devices 2290 and 2270 are full duplex.

In at least one embodiment, changing the channel 200 on a device 2290 is a simple procedure and similar to changing the channel 200 on device 125. Changing channels 200 allows users to be able to have the flexibility to move to a different channel 200 in order to communicate with a different set of users. It could be engineered in many different ways, but in this implementation, the user simply presses and holds the mute/channel change switch 188 and portable radio PTT switch 199. Upon pressing and holding down both switches, a prerecorded human voice slowly says the number of the next channel 200 and repeatedly cycles through the complete list of channels 200 until the user releases the switches 2320 and 199. The last channel 200 to be named by the human voice when the switches 2320 and 199 are released is the channel 200 that is selected. The device 2290 then joins the new channel 200.

A user could also attach an auxiliary audio or data device 2320 either wirelessly or wired to device 2270 in order to play audio, mobile phone communications, GPS directions, or other audio or data requirements.

The range of a device 2290 depends on the local environment, configured transmit power, frequency, channel bandwidth and data rate, among other factors. An exemplary embodiment operates with OFDM modulation running at 1.2 megabits per second (Mbps) with a channel bandwidth of 1.1 megahertz (MHz), and a transmit power up to 1 Watt. The LOS operational range with 1% packet error ratio (PER) is approximately 2000 feet, though a more conservative 1000 feet is specified for typical use-case scenarios. In at least one embodiment, at least one operating channel is in the range of about 800 MHz to about 1 gigahertz (GHz). In at least one embodiment, at least one operating channel is in the range from about 2.3 GHz to about 2.45 GHz. In at least one embodiment, the duration of each frame is between about 4 milliseconds (ms) and about 100 ms. In one embodiment, the frames each last 35.75 ms. In some embodiments, each frame includes 8 time slots available for devices to use for substantive data transmission and 1 shared time slot as described herein. In other embodiments, each frame includes 16 time slots available for devices to use for substantive data transmission and 1 shared time slot as described herein.

C. Multi-Device Data System (Example Context: Chemical Processing Vessel System)

Figure 12:
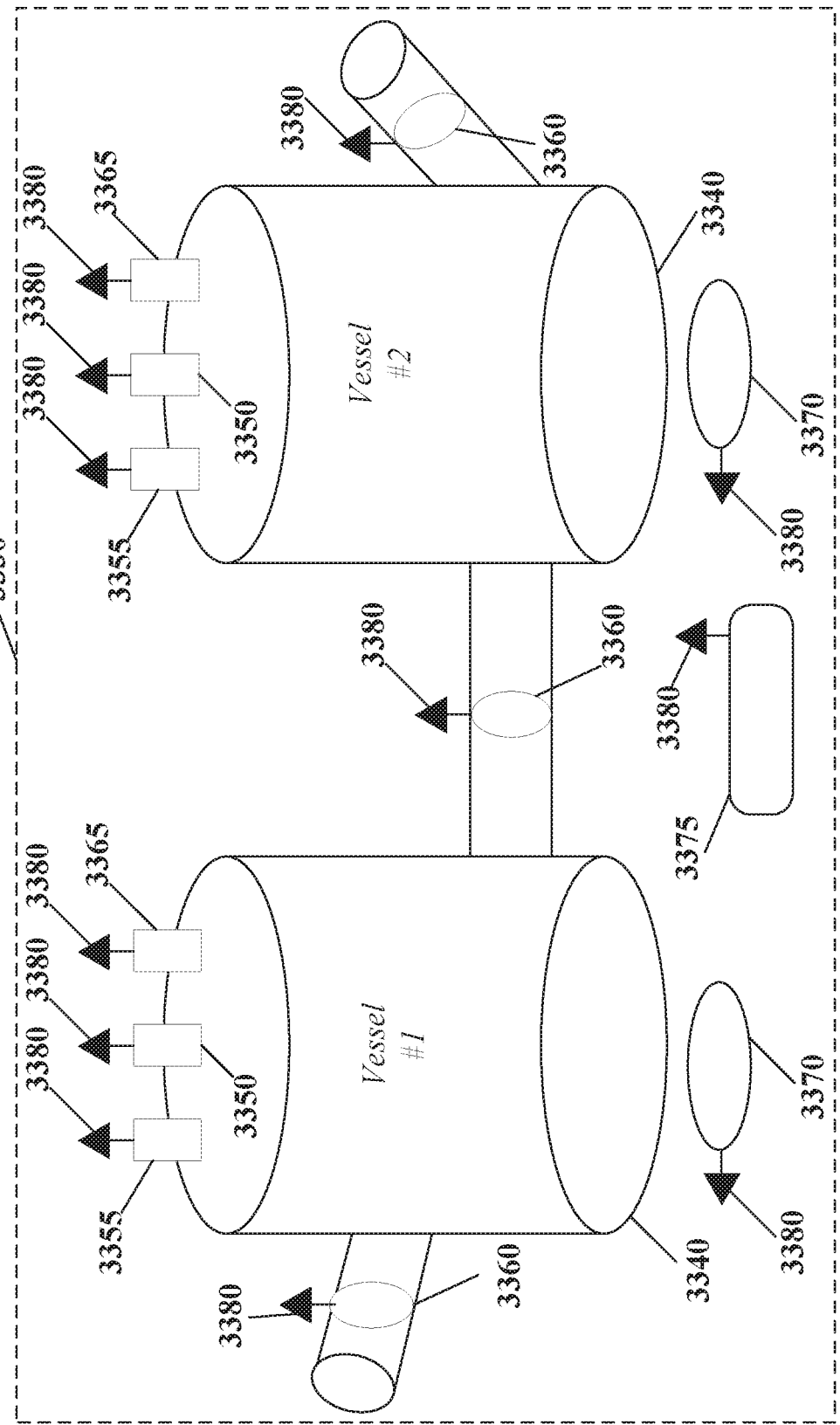
FIG. 12 is a diagrammatic view looking at an improved chemical processing vessel data communications system in connection with which an exemplary embodiment could be utilized.

FIG. 12 is a diagrammatic view looking at an improved chemical processing vessel system 3330. System 3330 is a representative application of a real-time, full-duplex data network that shows how embodiments of the present systems and methods can be used in a data network. The system 3330 has boiler vessels 3340, vessel pressure sensors 3350, vessel temperature sensors 3355, pipe valves with actuators 3360, pressure release valves with actuators 3365, tank heaters 3370, and a control panel 3375. Each of the vessel pressure sensors 3350, vessel temperature sensors 3355, pipe valves 3360, pressure release valves 3365, vessel heaters 3370, and control panel 3375 have attached communication devices 3380. Each of the communication devices 3380 are able to have real-time, full-duplex communications with all of the other communication devices 3380 in the system 3330.

In the system 3330, chemicals are processed through the vessels 3340. Precise pressure and temperature ranges must be maintained in order for the correct processing of the chemicals to take place. The temperature sensors 3355 and pressure sensors 3350 are constantly measuring and making sure that the temperatures and pressures of the vessels 3340 are within the prescribed range for proper processing. The communications devices 3380 attached to the temperature sensors 3355 and pressure sensors 3350 send out regular transmissions of their readings. The communications device 3380 of the control panel 3375 receives this data and the control panel 3375 continuously processes this data to make sure that there are no combinations of parameters that would cause damage to the system 3330 or misprocess the chemicals.

The communications device 3380 of the control panel 3375 also sends out frequent and regular transmissions to all of the other communication devices 3380 in system 3330 to let them know that the control panel 3375 is operating properly. If the other communications devices 3380 do not receive the regular transmissions from the control panel 3375, they initiate a safety procedure to shut down the chemical processing until the issue with the control panel 3375 can be repaired.

If the temperature sensor 3355 in a vessel 3340 detects that the temperature inside the vessel 3340 is below the proper range, then the communications device 3380 for that temperature sensor 3355 transmits that the vessel heater 3370 must be turned on in order to increase the temperature. Then the communications device 3380 for that vessel's heater 3370 receives the transmitted command and instructs the heater 3370 to begin heating the vessel 3340. This heater 3370 then transmits via its communications device 3380 that it has begun heating the vessel 3340 and that the heater 3370 is functioning properly. If the communications device 3380 for the vessel 3340 temperature sensor 3355 does not receive an affirmative transmission from the heater 3370 communications device 3380 that the heater 3730 is heating, then the communications device 3380 for the temperature sensor 3355 transmits a warning signal which the communications device 3380 attached to the control panel 3375 receives. Upon receiving such a warning signal via its attached communications device 3380, the control panel 3375 processes the information and transmits out via its communications device 3380 instructions to the valves 3360, heaters 3370, and pressure release valves 3365 via their communications devices 3380 how to proceed given the abnormal situation. The different parts of the system 3330 continue to communicate via their communications devices 3380 until the abnormality is corrected.

If the pressure sensor 3350 in a vessel 3340 detects that the pressure inside the vessel 3340 is above the proper range, then the communications device 3380 for that pressure sensor 3350 transmits that the vessel pressure release valve 3365 must release some pressure in the vessel 3340 in order to reduce the internal pressure. Then the communications device 3380 for that vessel's pressure release valve 3365 receives the transmitted command and instructs the valve 3365 to begin releasing pressure in the vessel 3340. This valve 3365 then transmits via its communications device 3380 that it has begun reducing the pressure in the vessel 3340 and that the valve 3365 is functioning properly. If the communications device 3380 for the vessel 340 pressure sensor 3350 does not receive an affirmative transmission from the valve's 365 communications device 3380 that the valve 3365 is reducing pressure, then the communications device 3380 for the pressure sensor 3350 transmits a warning signal which the communications device 3380 attached to the control panel 3375 receives. Upon receiving such a warning signal via its attached communications device 3380, the control panel 3375 processes the information and transmits out via its communications device 3380 instructions to the valves 3360, heaters 3370, and pressure release valves 3365 via their communications devices 3380 how to proceed given the abnormal situation. The different parts of the system 3330 continue to communicate via their communications devices 3380 until the abnormality is corrected.

When moving chemicals in system 3330 from one vessel 3340 to another vessel 3340, all of the devices in the system 3330 continuously transmit their readings and positions (e.g., states such as open, closed, etc.) via their communications devices 3380 and the control panel 3375 receives those transmissions via its communication device 3380. The control panel 3375 monitors all of the incoming data and transmits via its communication device 3380 instructions for the different devices in the system to follow in order to have chemicals transfer from one vessel 3340 to another in a safe and efficient manner.

III. Example Method

Figure 13:
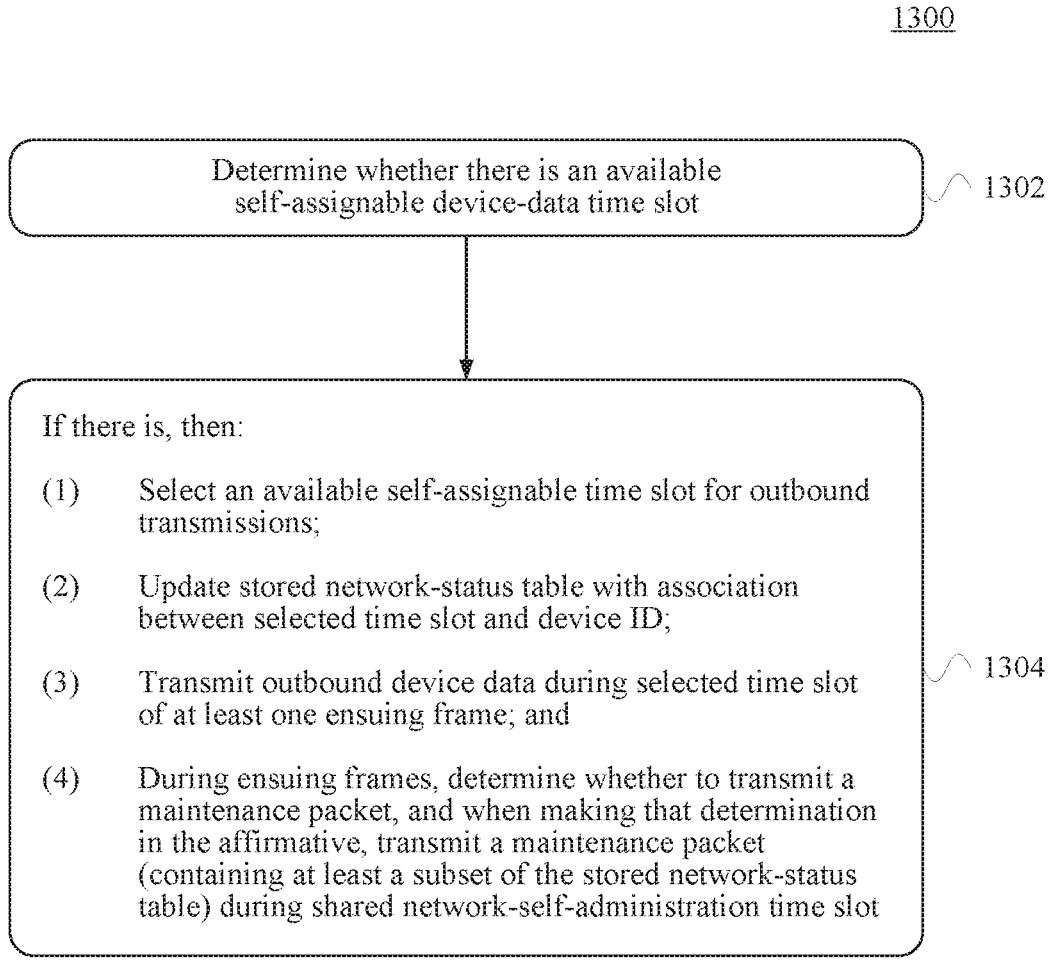
FIG. 13 is a flowchart of an example method according to an exemplary embodiment.

FIG. 13 is a flowchart of an example method 1300 that is carried out in at least one embodiment by a communication device 125 that includes a communication interface and data storage. The various functions that are described below in connection with FIG. 13 are also described above, and therefore are not described here in as great of detail.

At step 1302, the communication device 125 determines whether or not there is at least one available self-assignable device-data time slot 210 among N self-assignable device-data time slots 210 in a frame structure (of a shared air interface, in the case of embodiments involving wireless communication), where the structure of the frame 205 also includes a shared network-self-administration time slot 215.

In at least one embodiment, the communication device 125 carries out step 1302 at least in part by receiving and analyzing a maintenance packet 270 sent by another communication device 125 during the shared network-self-administration time slot 215 of a given frame 205. As described above, in at least one embodiment, the received maintenance packet 270 conveys a current status of the assignment of device-data time slots 210 to communication devices 125. The communication device 125 also updates its stored network-status table based on the received maintenance packet 270.

In at least one embodiment, the communication device 125 carries out step 1302 at least in part by tracking whether any device data is received via the communication interface during any one or more of the N device-data time slots 210 other than the selected time slot 210. In an embodiment, in any of those other time slots 210 in which the communication device 125 receives a packet 260, the communication device 125 updates the stored network-status table to associate the time slots 210 in which packets 260 are received with the respective source device IDs corresponding to the communication devices 125 that transmitted the respective packets 260 (e.g., in packet headers 225 of the respective packets 260).

Moreover, in at least one embodiment, the communication device 125 uses data received during a device-data time slot 210 other than the selected time slot 210 as a timing reference. In at least one such embodiment, the communication device 125 identifies the other device-data time slot 210 for use as the timing reference based on a device ID of a device 125 that is assigned to transmit during the other time slot 210. In some such embodiments, the communication device 125 had inserted the device ID of the other device 125 into the stored network-status table responsive to receiving the device ID in a packet header 225 associated with device data 230 received during the other time slot 210. In other such embodiments, the communication device 125 had inserted the device ID of the other device 125 into the stored network-status table responsive to receiving the device ID in a maintenance packet 270 during the shared network-self-administration time slot 215.

At step 1304, if it is determined at step 1302 that there is at least one available device-data time slot 210, then the communication device 125 carries out the below recited four steps, which are enumerated below as steps 1304(1) through 1304(4), respectively.

First, at step 1304(1), the communication device 125 selects an available device-data time slot 210 for outbound transmissions. The communication device 125 may do so using a random-selection approach or another approach deemed suitable by those of skill in the art for a given implementation.

Second, at step 1304(2), the communication device 125 updates its network-status table maintained in its data storage to include an association between the selected device-data time slot 210 and a device identifier of the communication device 125.

Third, at step 1304(3), the communication device 125 transmits outbound device data 230 via the communication interface during the selected device-data time slot 210 of at least one ensuing frame 205. In at least one embodiment, the communication device 125 includes a user interface, which itself includes the microphone 185 for receiving audio and speakers 193 for outputting audio; in such an embodiment, the outbound data 230 includes digital-audio data corresponding to audio received via the user interface (via, e.g., the microphone 185). Further, in such an embodiment, the communication device 125 outputs, via the user interface (via, e.g., the speakers 193), audio corresponding to any digital-audio data 230 received via the communication interface during any one or more of the N device-data time slots 210 other than the selected time slot 210. In at least one embodiment, the communication device 125 is communicatively connected to at least one sensor (e.g., the temperature sensor 3355), and the device data 230 includes sensor data (e.g., measured temperature data) from the at least one sensor.

Fourth, at step 1304(4), during each of a plurality of ensuing frames 205, the communication device 125 makes a determination as to whether to transmit a maintenance packet 270 during the shared network-self-administration time slot 215 of the current frame 205. When the communication device 125 makes that determination in the affirmative, the communication device 125 transmits a maintenance packet 270 via the communication interface during the shared network-self-administration time slot 215.

As described herein, in at least one embodiment, each such maintenance packet 270 contains at least a subset of the network-status table, which lists the device IDs and time-slot assignments of the other communication devices 125 that are currently on the network. As described above in steps 825, 840, and 850, in some embodiments, the communication device 125 maintains a maintenance-packet-transmission timer, and determines at each expiration of that timer whether or not to transmit a maintenance packet 270 during the given (or next) frame 205. Thus, in such embodiments, the above-mentioned plurality of ensuing frames 205 are those ensuing frames 205 that correspond to an expiration of the maintenance-packet-transmission timer maintained by the communication device 125.

In at least one embodiment, making the maintenance-packet determination includes randomly determining whether or not to transmit a maintenance packet 270 during the shared network-self-administration time slot 215 of the current frame 205. In some such embodiments, this includes basing the decision on a current network-occupancy level, which in this example corresponds to a current occupancy level of the shared air interface.

In at least one embodiment, each transmitted maintenance packet 270 includes the subset of the network-status table corresponding to communication devices 125 from which device data 230 (in packets 260) has been received within a preceding first timeout period. This first timeout period corresponds with the timer that is referenced in step 910 and is referred to as X seconds or Y cycles in step 920. The communication device 125 may reset the first timeout period for each communication device 125 upon receipt of device data 230 from the respective communication device 125. Moreover, the communication device 125 may drop communication devices 125 from being listed in outgoing maintenance packets 270 upon expiration of the first timeout period for the respective communication device 125.

In at least one embodiment, the network-status table further includes one or more communication devices 125 listed on one or more maintenance packets 270 received during the shared network-self-administration time slot 215 of one or more frames 205 within a preceding second timeout period. This second timeout period is referred to as Z seconds in step 930. The communication device 125 may reset the second timeout period for each communication device 125 upon receipt of each maintenance packet 270 listing the respective communication device 125, and may drop communication devices 125 from the network-status table upon expiration of the second timeout period for the respective communication device 125.

As described above, in at least one embodiment, communication device 125 operates in a listen-only mode if the communication device 125 determines in step 1302 that there is not at least one available device-data time slot 210. While operating in the listen-only mode, the communication device 125 may determine that a device-data time slot 210 has become available, and responsively select that time slot 210 for outbound transmissions.

If the communication device 125 detects a collision with at least one other device 125 in that device-data time slot 210, the communication device 125 responsively executes a time-slot-collision-arbitration protocol, which may include deciding whether to maintain a claim on that device-data time slot 210 or to cede the device-data time slot 210 for use by another device 125 based on a comparison of the device identifier of the communication device 125 with respective device identifiers of each of the at least one other device 125. The communication device 125 may execute a device-identifier-based time-slot-collision-arbitration protocol in each of various different situations such as joining a network (whether or not from a listen-only mode), merging networks, and/or the like.

What is claimed is:

1. A method carried out by a communication device that comprises data storage and a communication interface, the method comprising:
    determining whether or not there is at least one available self-assignable device-data time slot among N self-assignable device-data time slots in a frame structure, the frame structure further comprising a shared network-self-administration time slot; and
    if there is at least one available device-data time slot, then:
    selecting an available device-data time slot for outbound transmissions;
    updating a network-status table maintained in the data storage to include an association between the selected device-data time slot and a device identifier of the communication device;
    transmitting outbound device data via the communication interface during the selected device-data time slot of at least one ensuing frame; and operating in a listen-only mode if there is not at least one available device-data time slot.

2. The method of claim 1, further comprising:
during each of a plurality of ensuing frames, making a determination as to whether to transmit a maintenance packet during the shared network-self-administration time slot of the current frame, and transmitting such a packet via the communication interface during said shared time slot if the determination is made in the affirmative, each such maintenance packet containing at least a subset of the network-status table.

3. The method of claim 1, wherein:
the communication device further comprises a user interface, wherein the user interface comprises at least one microphone for receiving audio and at least one speaker for outputting audio;
the outbound data comprises digital-audio data corresponding to audio received via the user interface; and
the method further comprises: outputting, via the user interface, audio corresponding to any digital-audio data received via the communication interface during any one or more of the N device-data time slots other than the selected time slot.

4. The method of claim 1, wherein:
the communication device is communicatively connected to at least one sensor; and
the device data comprises sensor data from the at least one sensor.

5. The method of claim 1, further comprising using data received during a device-data time slot other than the selected time slot as a timing reference.

6. The method of claim 5, further comprising identifying the other device-data time slot for use as the timing reference based on a device ID of a device assigned to transmit during the other time slot.

7. The method of claim 1, further comprising:
while operating in the listen-only mode, determining that a device-data time slot has become available, and responsively selecting that time slot for outbound transmissions.

8. The method of claim 7, further comprising:
detecting a collision with at least one other device in that device-data time slot, and responsively executing a time-slot-collision-arbitration protocol.

9. The method of claim 8, wherein executing the time-slot-collision-arbitration protocol comprises deciding whether to maintain a claim on that device-data time slot or to cede the device-data time slot for use by another device based on a comparison of the device identifier of the communication device with respective device identifiers of each of the at least one other device.

10. The method of claim 1, further comprising detecting a collision with at least one other device in the selected device-data time slot, and responsively executing a time-slot-collision-arbitration protocol.

11. A communication device comprising:
a communication interface;
a processor; and
data storage containing instructions executable by the processor for carrying out a set of functions, wherein the set of functions comprises:
determining whether or not there is at least one available self-assignable device-data time slot among N self-assignable device-data time slots in a frame structure, the frame structure further comprising a shared network-self-administration time slot; and
if there is at least one available device-data time slot, then:
selecting an available device-data time slot for outbound transmissions;
updating a network-status table maintained in the data storage to include an association between the selected device-data time slot and a device identifier of the communication device;
transmitting outbound device data via the communication interface during the selected device-data time slot of at least one ensuing frame;
operating in a listen-only mode if there is not at least one available device-data time slot.

12. The communication device of claim 11, wherein the set of functions further comprises:
during each of a plurality of ensuing frames, making a determination as to whether to transmit a maintenance packet during the shared network-self-administration time slot of the current frame, and transmitting such a packet via the communication interface during said shared time slot if the determination is made in the affirmative, each such maintenance packet containing at least a subset of the network-status table.

13. The communication device of claim 11, further comprising a user interface, wherein the outbound data comprises digital-audio data corresponding to audio received via the user interface, and wherein the set of functions further comprises:
outputting, via the user interface, audio corresponding to any digital-audio data received via the communication interface during any one or more of the N device-data time slots other than the selected time slot.

14. The communication device of claim 11, wherein:
the communication device is communicatively connected to at least one sensor; and
the device data comprises sensor data from the at least one sensor.

15. The communication device of claim 11, wherein the set of functions further comprises:
while operating in the listen-only mode, determining that a device-data time slot has become available, and responsively selecting that time slot for outbound transmissions.

16. A communication device comprising:
a communication interface;
a processor; and
data storage containing instructions executable by the processor for carrying out a set of functions, wherein the set of functions comprises:
determining whether or not there is at least one available self-assignable device-data time slot among N self-assignable device-data time slots in a frame structure, the frame structure further comprising a shared network-self-administration time slot; and
if there is at least one available device-data time slot, then:
selecting an available device-data time slot for outbound transmissions;
updating a network-status table maintained in the data storage to include an association between the selected device-data time slot and a device identifier of the communication device;
transmitting outbound device data via the communication interface during the selected device-data time slot of at least one ensuing frame; and changing operational parameters of the communication device based upon received device data or a maintenance packet.

17. The communication device of claim 16, wherein the set of functions further comprises:
   during each of a plurality of ensuing frames, making a determination as to whether to transmit the maintenance packet during the shared network-self-administration time slot of the current frame, and transmitting such a packet via the communication interface during said shared time slot if the determination is made in the affirmative, each such maintenance packet containing at least a subset of the network-status table.

18. The communication device of claim 17, wherein:
   the communication device is communicatively connected to at least one sensor; and
   the device data comprises sensor data from the at least one sensor.

19. The communication device of claim 17, wherein the set of functions further comprises operating in a listen-only mode if there is not at least one available device-data time slot.

20. The communication device of claim 19, wherein the set of functions further comprises:
   while operating in the listen-only mode, determining that a device-data time slot has become available, and responsively selecting that time slot for outbound transmissions.

* * * * *